G. J. CAPEWELL, Jr.
WIND SHIELD FOR VEHICLES.
APPLICATION FILED OCT. 3, 1910.
1,060,971.
Patented May 6, 1913.
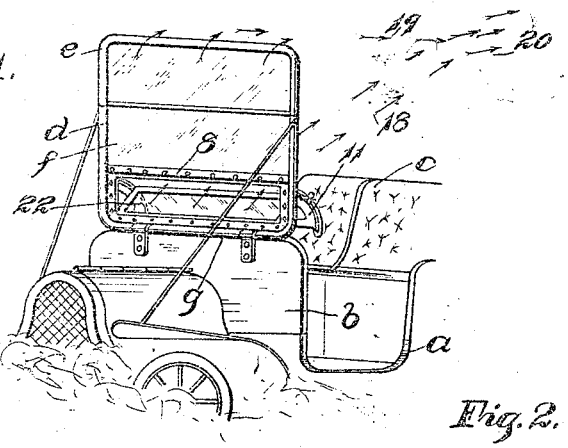
WITNESSES:
INVENTOR.
George J. Capewell, Jr.
BY
Arthur B. Jenkins
ATTORNEY.

UNITED STATES PATENT OFFICE.

GEORGE J. CAPEWELL, JR., OF HARTFORD, CONNECTICUT.

WIND-SHIELD FOR VEHICLES.

1,060,971.

Specification of Letters Patent.

Patented May 6, 1913.

Application filed October 3, 1910. Serial No. 584,975.

*To all whom it may concern:*

Be it known that I, GEORGE J. CAPEWELL, Jr., a citizen of the United States, and a resident of Hartford, in the county of Hartford and State of Connecticut, have invented a new and Improved Wind-Shield for Vehicles, of which the following is a specification.

My invention relates to the class of devices for shielding the occupants of a moving vehicle from drafts of air, and the object of the invention is to provide a device of this class having numerous novel features of advantage and utility.

One form of device in the use of which the objects herein sought may be attained is illustrated in the accompanying drawings, in which—

Figure 1 is a detail perspective view showing the manner of application of my improved wind shield. Fig. 2 is a detail view, scale enlarged, over that of Fig. 1, showing the lower portion of a wind shield embodying my invention, the shield being shown as attached to a vehicle. Fig. 3 is a detail view in section through the shield illustrating its manner of construction.

Prior to my invention wind shields have been used, especially upon automobiles, which shields have been constructed of glass or other material, the upper edge of the shield, however, being located a short distance below a horizontal plane in the line of vision of the occupants of the seat immediately behind the shield. The top edge of the shield is thus located low enough to enable the occupants of the vehicle immediately behind the shield to see over the top of the shield and into the roadway immediately in front of the vehicle, the shield deflecting the current of air so that it will pass over the head of an occupant of said front seat, but with a result that a back draft is created which strikes such occupant at the back of the neck.

By the use of my improved device a shield may be used over the top of which a clear view of the roadway immediately in front of the vehicle may be obtained, the drafts of air will be directed over the head of the occupant of the driver's seat, and this back draft of air is counteracted, and at the same time any amount of ventilation required may be supplied to the occupant of the driver's seat in such amounts as will not prove an annoyance. Such a device is shown in the accompanying drawings in which the letter *a* indicates generally the body of an automobile of any desired construction, and including a dash *b* and driver's seat *c*. A wind shield is secured to the upper edge of the dash *b*, this shield consisting of a lower stationary portion *d* and an upper swinging portion *e*, all of the parts herein described being of any suitable construction, which forming no part of my invention, except in connection with the parts to be hereinafter described, a specific and detailed description thereof is omitted.

In the lower part of the main or body part of the shield I form an opening and within this opening I place a deflector hinged at its lower edge and which may be opened to any desired extent for the purpose of controlling the amount of air and the direction of the air currents entering through said opening. Many different forms for carrying this idea into effect may be provided, a satisfactory construction being illustrated in the drawings herein and made as follows:

The lower part of the glass *f* of the body part of the shield is removed leaving an opening between the lower edge of the glass and the bottom *g* of the frame. Within this opening a frame of metal or other suitable material is secured in any suitable manner, this frame including top and bottom bars 6 and end bars 7, the bottom bar projecting within a groove in the top of the lower bar *g* in the frame, this groove being the same as that usually occupied by the bottom edge of the glass *f*, clamps *h* secured to the dash *b* holding the frame in position.

Strips 8 of any suitable material, preferably metal, are secured to the upper bar 6 and project upward beyond its edge to engage opposite sides of the glass *f* and firmly secure it in place, an insulating material 9 being employed if thought best to protect the glass.

A deflector 22 is secured at its lower edge as by means of a hinge 10 to the lower frame bar 6. Wings 11 are secured to the end bars 7, as shown herein bases 12 on the wings receiving screws by means of which they are fastened to the bars. These wings 11 are located at the ends of the deflector 22, and each wing has a slot 13 through which a clamp screw 14 projects and which may be secured as by means of a thumb nut 15. A traveler 16 is secured to the screw 14, the end of this traveler being connected as by means of a pivot 17 with the edge of the deflector 22. By means of this construction it will be noted that the deflector 22 may be secured to provide an opening of any desired area between the maximum and minimum capacity of the opening at the bottom of the shield, and that by placing this deflector in different positions the direction of the currents of air passing through the opening at the bottom of the shield may be controlled so that if a gentle draft is required in the face of the driver it may be obtained and this may be graduated to any desired extent, or the air may be caused to strike the driver if desired at any location between the feet and the head. The direction of this draft of air passing in at the opening at the bottom of the shield is denoted by the arrows 18 in Fig. 1 of the drawings and the usual course of the current of air passing over the top of the shield and at the point at which it passes over the head of the driver is indicated by the arrows 19. The arrows located at the numeral 20 indicate the change in the direction of the air current passing over the top of the shield, which prevents said current from being deflected downward to strike the driver in the back of the neck.

While I have shown and described herein one form of construction for accomplishing the end desired, I do not confine my invention to such construction, as it may be departed from to a greater or lesser extent and yet embody the invention.

I claim—

A wind shield for vehicles including a frame inclosing a glass with an opening between the glass and the lower edge of the frame, a supplemental frame fitting within a groove in the bottom of the main frame; said supplemental frame supporting the glass of the main frame, and a deflector pivotally mounted to close the opening in the supplemental frame.

GEORGE J. CAPEWELL, Jr.

Witnesses:
 LENA E. BERKOVITCH,
 GERTRUDE B. LYNCH.